United States Patent
Joseph et al.

(10) Patent No.: US 11,235,861 B2
(45) Date of Patent: Feb. 1, 2022

(54) HORIZONTAL STABILIZER TRIM ACTUATOR SYSTEMS AND METHODS

(71) Applicant: The Boeing Company, Chicago, IL (US)

(72) Inventors: Derek M. Joseph, Saint Louis, MO (US); Kevin B. Eck, Saint Peters, MO (US); Christopher D. Feet, Snohomish, WA (US); Yonas T. Meshesha, Lynwood, WA (US); Timothy J. Soderquist, Marysville, WA (US); Barry D. Hance, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 259 days.

(21) Appl. No.: 16/530,719

(22) Filed: Aug. 2, 2019

(65) Prior Publication Data

US 2020/0140063 A1 May 7, 2020

Related U.S. Application Data

(63) Continuation of application No. 15/214,366, filed on Jul. 19, 2016, now Pat. No. 10,450,056.

(51) Int. Cl.
*B64C 13/40* (2006.01)
*B64C 5/10* (2006.01)
(Continued)

(52) U.S. Cl.
CPC ............... *B64C 13/40* (2013.01); *B64C 5/02* (2013.01); *B64C 5/10* (2013.01); *F15B 11/08* (2013.01);
(Continued)

(58) Field of Classification Search
CPC ... B64C 13/40; B64C 5/02; B64C 5/10; F15B 13/0402; F15B 11/08; F15B 13/042; F15B 2211/327; F15B 2211/41509; F15B 2211/411; F15B 2211/765; F15B 2211/3111; F15B 2211/30565; F15B 2211/329; F15B 2211/7058;
(Continued)

(56) References Cited

U.S. PATENT DOCUMENTS 4,449,442 A * 5/1984 Ebbing ............... F15B 13/16
74/640
4,555,978 A 12/1985 Burandt et al.
(Continued)

FOREIGN PATENT DOCUMENTS

EP 1182134 2/2002
GB 2119967 11/1983

OTHER PUBLICATIONS

"Sae AIR6052: Trimmable Horizontal Stabilizer Actuator Descriptions," Aerospace Information Report, Sep. 2011, pp. 1-38, SAE International, Warrendale/USA.

*Primary Examiner* — Assres H Woldemaryam
(74) *Attorney, Agent, or Firm* — Haynes and Boone, LLP (57) ABSTRACT

A vehicle control surface, such as an aircraft horizontal stabilizer, is hydraulically controlled using solenoid operated valves (SOVs) controlling directional control valves and/or rate control valves with small numbers of ports, e.g. a four port three position directional control value and/or a four port two position rate control valve.

27 Claims, 8 Drawing Sheets

(51) Int. Cl.
*B64C 5/02* (2006.01)
*F15B 11/08* (2006.01)
*F15B 13/04* (2006.01)
*F15B 13/042* (2006.01)

(52) U.S. Cl.
CPC ........ *F15B 13/0402* (2013.01); *F15B 13/042* (2013.01); *F15B 2211/30565* (2013.01); *F15B 2211/3111* (2013.01); *F15B 2211/327* (2013.01); *F15B 2211/329* (2013.01); *F15B 2211/411* (2013.01); *F15B 2211/41509* (2013.01); *F15B 2211/428* (2013.01); *F15B 2211/634* (2013.01); *F15B 2211/7058* (2013.01); *F15B 2211/715* (2013.01); *F15B 2211/765* (2013.01)

(58) Field of Classification Search
CPC .......... F15B 2211/634; F15B 2211/428; F15B 2211/715

See application file for complete search history.

(56) References Cited

U.S. PATENT DOCUMENTS

| | | | | |
|---|---|---|---|---|
| 4,840,031 | A | * | 6/1989 | Hribar .................... B64C 13/40 60/338 |
| 4,887,214 | A | * | 12/1989 | Takats .................. B64C 13/505 701/3 |
| 6,298,661 | B1 | * | 10/2001 | Holder .................. F04B 49/002 60/451 |
| 6,439,512 | B1 | * | 8/2002 | Hart ...................... B64C 13/505 244/178 |
| 8,359,851 | B2 | | 1/2013 | Haase |
| 8,418,955 | B2 | | 4/2013 | Recksiek et al. |
| 2012/0090311 | A1 | * | 4/2012 | Le Coq ................... F01D 17/22 60/484 |
| 2013/0001357 | A1 | | 1/2013 | Cyrot |
| 2014/0027568 | A1 | * | 1/2014 | Fleddermann .......... B64C 13/42 244/58 |
| 2015/0083852 | A1 | * | 3/2015 | Moser ...................... B64C 9/14 244/99.3 |
| 2015/0243113 | A1 | * | 8/2015 | Cahill ....................... G01L 5/28 701/32.8 |
| 2016/0031553 | A1 | * | 2/2016 | Di Zazzo ............... B64C 25/44 701/3 |
| 2018/0372134 | A1 | * | 12/2018 | Brewer ................... F15B 13/12 |

* cited by examiner

FIG. 7

HORIZONTAL STABILIZER TRIM ACTUATOR SYSTEMS AND METHODS

CROSS-REFERENCE To RELATED APPLICATION AND CLAIM OF PRIORITY

The present patent application is a continuation of U.S. patent application Ser. No. 15/214,366 filed on Jul. 19, 2016, titled "Horizontal Stabilizer Trim Actuator Systems and Methods," which is hereby incorporated by reference in its entirety.

BACKGROUND

1. Technical Field

The disclosure relates generally to aircraft control surface systems and more specifically to Horizontal Stabilizer Trim Actuator (HSTA) systems used to control horizontal control surfaces.

2. Related Art

Aircraft often include one or more control surfaces such as, for example, one or more horizontal stabilizers. The horizontal stabilizer may be located, for example, at the rear of the aircraft and may include elevator control surfaces that are attached that may be used to change the pitch of the aircraft. A Horizontal Stabilizer Trim Actuator (HSTA) may be used to move the horizontal control surface. The HSTA may be, for example, a hydraulic system that may actuate the horizontal control surface responsive to commands issued by a controller or pilot of the aircraft.

In certain examples, the horizontal control surface may be moved to alleviate load on the elevator control surfaces. In such examples, un-commanded or unintended movement of the horizontal stabilizer may not be desirable. As such, a HSTA designed to prevent such un-commanded or unintended movement is desirable.

SUMMARY

Systems and methods are disclosed herein for a hydraulic stabilizer trim actuator. In certain examples, a system may be disclosed and may include a hydraulic inlet configured to receive pressurized hydraulic fluid, a first hydraulic path fluidically connected to the hydraulic inlet, a second hydraulic path, a hydraulic shutoff apparatus fluidically connected to the first hydraulic path and the second hydraulic path and configured to be switched between a plurality of hydraulic positions wherein at least one of the hydraulic positions allows for the pressurized hydraulic fluid to flow from the first hydraulic path through the hydraulic shutoff apparatus to the second hydraulic path, a directional and rate control apparatus, a third hydraulic path fluidically connected to the directional and rate control apparatus, and a hydraulic motor fluidically connected to the directional and rate control apparatus via the third hydraulic path.

The directional and rate control apparatus may be configured to be switched between a plurality of directional control positions where at least one of the directional control positions allows for the pressurized hydraulic fluid to flow from the second hydraulic path through the directional and rate control apparatus to the hydraulic motor. The hydraulic motor may be configured to turn an output shaft to actuate a control surface of a vehicle responsive to receiving the pressurized hydraulic fluid from the directional and rate control apparatus and configured to be locked responsive to not receiving the pressurized hydraulic fluid from the directional and rate control apparatus.

In certain other examples, a method may be disclosed and may include receiving pressurized hydraulic fluid, flowing the pressurized hydraulic fluid into a hydraulic shutoff apparatus, switching, responsive to the flow of the pressurized hydraulic fluid into the hydraulic shutoff apparatus, the hydraulic shutoff apparatus to a first hydraulic position, flowing the pressurized hydraulic fluid into a directional and rate control apparatus, switching, responsive to the flow of the pressurized hydraulic fluid into the directional and rate control apparatus, a directional control valve of the directional and rate control apparatus to a first directional control position, monitoring the position of the directional control valve, actuating, responsive to the flow of the pressurized hydraulic fluid into the hydraulic motor, the hydraulic motor, turning an output shaft of the hydraulic motor, and actuating a control surface.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

Moreover, other devices, apparatus, systems, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE FIGURES

The disclosure may be better understood by referring to the following figures. The components in the figures are not necessarily to scale, emphasis instead being placed upon illustrating the principles of the disclosure. In the figures, like reference numerals designate corresponding parts throughout the different views.

Examples of the disclosure and their advantages are best understood by referring to the detailed description that

DETAILED DESCRIPTION

Aircraft may include control surfaces such as, for example, horizontal control surfaces located at an aft portion of the aircraft. The horizontal control surface may include one or more elevator control surfaces coupled to the horizontal control surface. The one or more elevator control surfaces may be used to, for example, change a pitch of the aircraft.

A Horizontal Stabilizer Trim Actuator (HSTA) may be used to move the control surface (e.g., the horizontal control surface). The HSTA may, for example, change an angle of attack of the control surface or change a position of the control surface. The control surface may be moved to, for example, alleviate load on the one or more elevator control surface. In certain examples, un-commanded or unintended movement of the control surface may be undesirable. As such, a HSTA design minimizing the chance of such un-commanded or unintended movement may be desirable. Additionally, it may be desirable to keep the design of the HSTA as simple as possible to improve reliability, decrease cost, and minimize weight.

Figure 1:
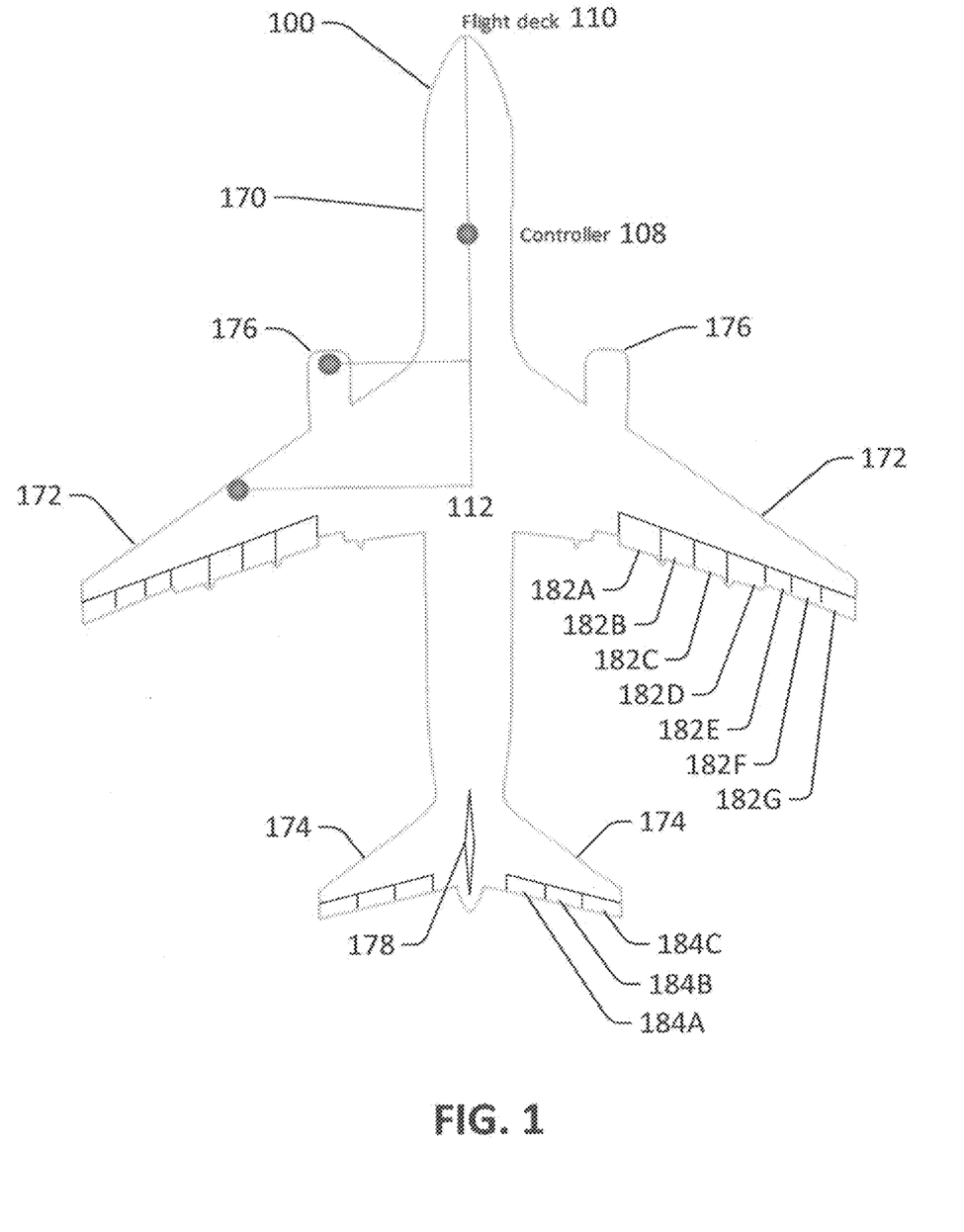
FIG. 1 illustrates an example aircraft in accordance with an example of the disclosure.

FIG. 1 illustrates an example aircraft in accordance with the disclosure. The aircraft 100 of FIG. 1 may include a fuselage 170, wings 172, horizontal stabilizers 174, aircraft engines 176, and a vertical stabilizer 178. The wings 172s may include the movable wing components 182A-G. The movable wing components 182A-G may be flaps, ailerons, flaperons, slats, and other movable components coupled to the wings 172. The horizontal stabilizers 174 may include the movable stabilizer components 184A-C. The movable stabilizer components 184A-C may be elevator or other movable components coupled to the horizontal stabilizers 174.

Additionally, the aircraft 100 may include a controller 108 and a flight deck 110. The various components of the aircraft 100 may be linked with communications 112 to communicate commands and conditions detected. The aircraft 100 described in FIG. 1 is exemplary and it is appreciated that in other embodiments, the aircraft 100 may include less or additional components (e.g., no horizontal stabilizer or additional stabilizers). Additionally, concepts described herein may be extended to other aircraft such as helicopters, Unmanned Aerial Vehicles, etc.

The flight deck 110 of the aircraft 100 may include controls that may be manipulated by the pilot(s) of the aircraft 100 to provide instructions for the operation of the aircraft. For example, the flight deck 110 may include a control or controls for determining the throttle position or wing and/or horizontal stabilizer configuration of the aircraft (e.g., movement of the wings 172, horizontal stabilizers 174, movable wing components 182A-G, and/or movable stabilizer components 184A-C). The flight deck 110 may also include controls for determining a configuration of the horizontal stabilizer or other aerodynamic device of the aircraft 100 as well as the configuration of the vertical stabilizer.

The flight deck 110, the wings 172, the horizontal stabilizers 174, the movable wing components 182A-G, the movable stabilizer components 184A-C, as well as other components, may be communicatively coupled through one or more communication channels 112. The communication channel 112 may, for example, be a digital communication channel such as a wired communication circuit or a wireless communications system or an analog communication channel. The communication channel 112 may link the various components to the controller 108.

The controller 108 may include, for example, a single-core or multi-core processor or microprocessor, a microcontroller, a logic device, a signal processing device, memory for storing executable instructions (e.g., software, firmware, or other instructions), and/or any elements to perform any of the various operations described herein. In various examples, the controller 108 and/or its associated operations may be implemented as a single device or multiple devices (e.g., communicatively linked through analog, wired, or wireless connections such as the communication channel 112) to collectively constitute the controller 108.

The controller 108 may include one or more memory components or devices to store data and information. The memory may include volatile and non-volatile memory. Examples of such memories include RAM (Random Access Memory), ROM (Read-Only Memory), EEPROM (Electrically-Erasable Read-Only Memory), flash memory, or other types of memory. In certain examples, the controller 108 may be adapted to execute instructions stored within the memory to perform various methods and processes described herein, including implementation and execution of control algorithms responsive to sensor and/or operator (e.g., flight crew) inputs.

Figure 2:
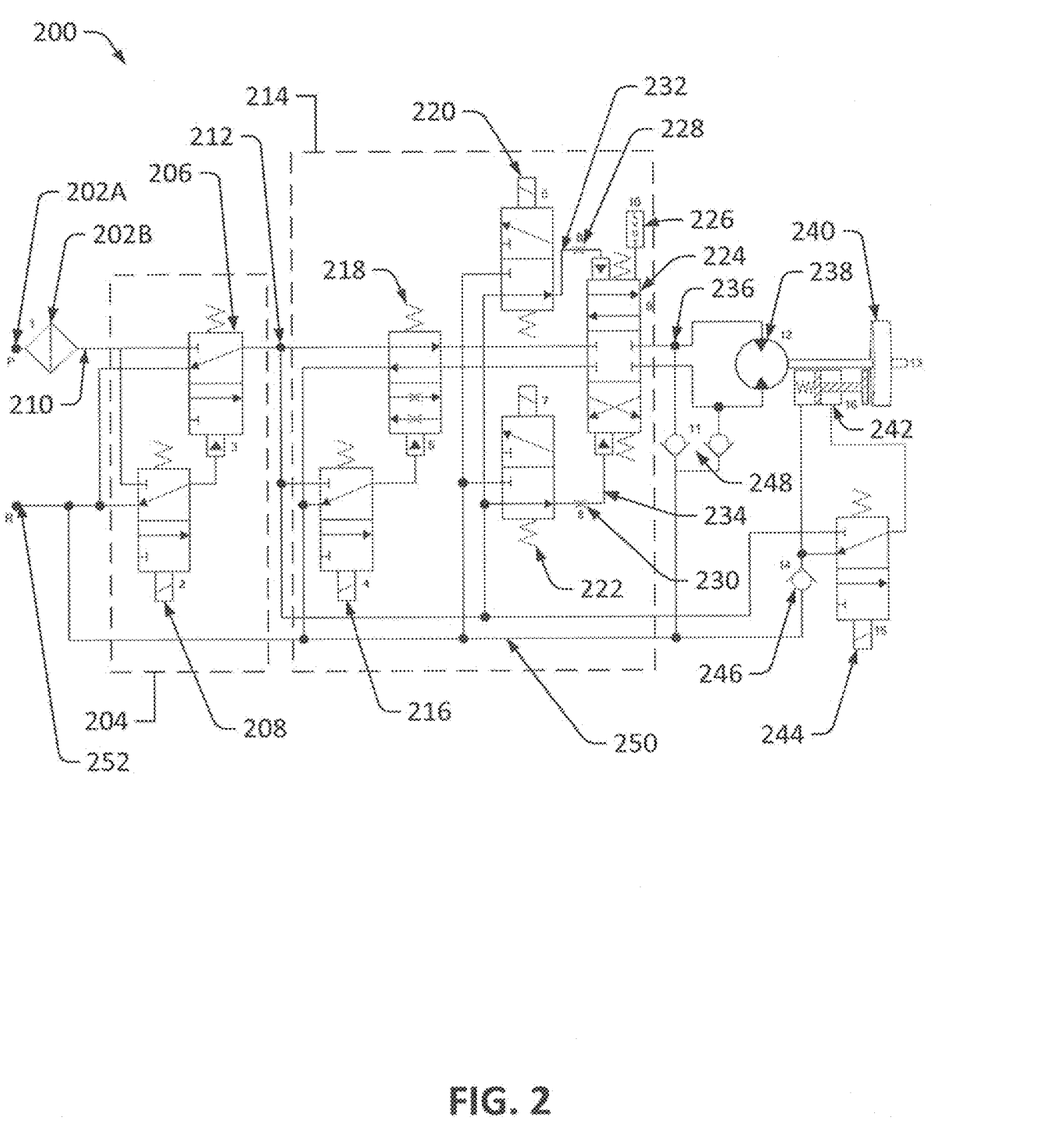
FIG. 2 illustrates an example horizontal stabilizer trim actuator in accordance with an example of the disclosure.

FIG. 2 illustrates an example horizontal stabilizer trim actuator (HSTA) in accordance with an example of the disclosure. The HSTA 200 shown in FIG. 2 includes a hydraulic shutoff apparatus 204 and a directional and rate control apparatus 214. Both the hydraulic shutoff apparatus 204 and the directional and rate control apparatus 214 may include one or more components.

The HSTA 200 may additionally include an inlet 202A and a filter 202B, a hydraulic motor 238, an output shaft 240, a hydraulic brake 242, a brake controller 244, a return check valve 246, anti-cavitation valves 248, and a return port 252. In this example, the hydraulic brake 242 may be a brake apparatus. Optionally (as discussed later), the brake apparatus may be the hydraulic brake 242 or an electric brake.

The inlet 202A and the filter 202B (i.e., inlet filter) are fluidically connected to the hydraulic shutoff apparatus 204 via the first hydraulic path 210. (For the purposes of this disclosure, when two components are "fluidically connected" a fluid may flow from one component to the other. There may be additional components between the two components that, in certain situations, may shut off the flow of the fluid between the two components. As long as the fluid may flow between the two components in a certain configuration, they are considered to be "fluidically connected.") As such, hydraulic fluid, which may be pressurized, may flow from the inlet 202A, through the filter 202B, and through the first hydraulic path 210 to the hydraulic shutoff apparatus 204.

In the example shown in FIG. 2, the hydraulic shutoff apparatus 204 may include the shutoff SOV 208 and the shutoff spool 206. The shutoff SOV 208 (which may be a shutoff solenoid) may be a normally closed 3-port 2-position solenoid (i.e., a two position solenoid) operated valve. In certain examples, the solenoid operated valve may be operated by, for example, the controller 108 (e.g., through an algorithm of the controller 108), from a pilot command, or through another operating technique. The shutoff SOV 208 may control pilot pressure to the shutoff spool 206. The shutoff spool 206 may be a normally closed 3-port 2-position pilot operated valve (e.g., operated by pilot pressure from, for example, the shutoff SOV 208). When the shutoff SOV 208 is energized (e.g., the solenoid is operated so that it is in the open position as opposed to the normally closed position) pilot pressure from the pressurized hydraulic fluid flowing from the first hydraulic path 210 may energize the shutoff spool 206 (e.g., change the position of the shutoff spool 206 to an open position) such that the shutoff spool 206 allows pressurized hydraulic fluid to flow from the first hydraulic path 210 through the shutoff spool 206 to the directional and rate control apparatus 214. Alternatively, when the shutoff SOV 208 is de-energized, the hydraulic fluid in the second hydraulic path 212 may be routed back to the return port 252.

The pressurized hydraulic fluid may then flow from the hydraulic shutoff apparatus 204 to the directional and rate control apparatus 214. In certain examples, the directional and rate control apparatus 214 may include a rate control SOV 216, a rate control spool 218, a control trim up SOV 220, a control trim down SOV 222, a directional control valve 224, and a Linear Variable Differential Transformer (LVDT) 226. Other examples of the directional and rate control apparatus 214 may include additional, fewer, and/or different components.

The rate control SOV 216 may be a normally closed 3-port 2-position solenoid operated valve. The rate control SOV 216 may control pilot pressure to the rate control spool 218. The rate control spool 218 may be a normally open 4-port 2-position pilot operated valve operated via pilot pressure from the rate control SOV 216. When the shutoff spool 206 is energized, pressurized hydraulic fluid may flow into second hydraulic path 212. From the second hydraulic path 212, the pressurized hydraulic fluid may flow to the rate control SOV 216. When the rate control spool 216 is energized (e.g., switched from the closed position to an open position), pilot pressure from the rate control SOV 216 may accordingly energize the rate control spool 218.

Pressurized hydraulic fluid from the second hydraulic path 212 may flow through the rate control spool 218. In a normal configuration (e.g., when the rate control spool 218 is not energized), the rate control spool 218 may be in a low flow resistance configuration (e.g., a high flow rate configuration). When the rate control spool 218 is energized, the rate control spool 218 may be in a high flow resistance configuration (e.g., a low flow rate configuration) and provide additional resistance to the flow of pressurized hydraulic fluid through the rate control spool 218. As such, operation of the rate control SOV 216 may control the resistance of the rate control spool 218 to flow of the hydraulic fluid. In certain examples, the rate control spool 218 may include two paths for pressurized hydraulic fluid to flow through.

Pressurized hydraulic fluid from the rate control spool 218 may flow to the directional control valve 224. The directional control valve 224 may be a 4-port (i.e., a four port control valve or four port valve) 3-position control valve that is spring-centered and pressure-centered. The directional control valve 224 may be pressure-centered via pilot pressure from the control trim up SOV 220 and the control trim down SOV 222. Pilot pressure from the control trim up SOV 220 may reach the directional control valve 224 via a fourth hydraulic path 232 and pilot pressure from the control trim down SOV 222 may reach the directional control valve 224 via a fifth hydraulic path 234. In examples where the rate control spool 218 includes two paths for pressurized hydraulic fluid to flow through, the directional control valve 224 may also receive the pressurized hydraulic fluid via two paths.

The control trim up SOV 220 and the control trim down SOV 222 may both be normally open 3-port 2-position solenoid operated valves. The control trim up SOV 220 and/or the control trim down SOV 222 may control pilot pressure from the respective control trim up/down SOV to the directional control valve 224. Energizing the control trim up SOV 220 and/or the control trim down SOV 222 may change the configuration of the respective SOV to a closed position. In the closed position, pilot pressure may not be present to the direction control valve 224. Additionally, pilot pressure restrictions 228 and 230 may additionally be coupled to the fourth hydraulic path 232 and the fifth hydraulic path 234. The pilot pressure restrictions 228 and 230 may control the flow and/or the pressure of hydraulic fluid through the fourth hydraulic path 232 and the fifth hydraulic path 234 as an alternative technique of controlling the configuration of the directional control valve 224. For example, the configuration of the directional control valve 224 may be controlled by restricting none, one, or both of the flow of pressurized hydraulic fluid through the fourth hydraulic path 232 and/or the fifth hydraulic path 234. The pilot pressure restrictions 228 and 230 may be controlled by the controller 108, by the pilot, fixed through mechanical means, or through another technique.

Referring back to the directional control valve 224, the current directional control valve 224 may include 3 positions. When pilot pressure from both or neither of the control trim up 220 and the control trim down 222 are present, the directional control valve 224 may be in a first configuration that prevents flow through both of the paths that the pressurized hydraulic fluid flows through to the third hydraulic path 236. In certain examples, the first configuration may be a centered position of the directional control valve 224. When pilot pressure from only one of the control trim up SOV 220 and the control trim down SOV 222 is present, the directional control valve 224 may be in a second configuration that allows flow of the pressurized hydraulic fluid linearly through the directional control valve 224 or may be in a third configuration that crosses the flow of the hydraulic fluid through the directional control valve 224.

In general, the directional control valve is a four port valve and is configured to be switched between at least three positions including a first position configured to prevent flow of the pressurized hydraulic fluid through the directional control valve, a second position configured to allow for the pressurized hydraulic fluid to flow through the directional control valve to the hydraulic motor in a first manner, and a third position configured to allow for the pressurized hydraulic fluid to flow through the directional control valve to the hydraulic motor in a second manner.

For example, the directional control valve 224 may include first and second inlets and first and second outlets. In the first configuration, no or minimal flow may be allowed through the directional control valve 224. In the second configuration, hydraulic fluid entering the first inlet may flow through to the first outlet and hydraulic fluid entering the second inlet may flow through to the second outlet. In the third configuration, hydraulic fluid entering the first inlet may flow through to the second outlet and hydraulic fluid entering the second inlet may flow through to the first outlet.

In certain examples, the position of the directional control valve 224 may be monitored by the Linear Variable Displacement Transformer (LVDT) 226. The LVDT 226 may determine and output data directed to the position of the directional control valve 224 to the controller 108. The controller 108 may then confirm, from the LVDT 226 output, that the position of the directional control valve 224 is consistent with that commanded (e.g., via commands given to the solenoids of the control trim up SOV 220 and/or the control trim down SOV 222). Certain other examples may not include the LVDT 226. In such examples, the position of the directional control valve 226 may be determined from the commands issued by the controller 108.

Pressurized hydraulic fluid exiting the directional control valve 224 may flow into a third hydraulic path 236. The third hydraulic path 236 may, for example, be fluidically connected to the hydraulic motor 238. The hydraulic motor 238 may be powered by the pressurized hydraulic fluid flowing from the directional control valve 224 into, for example, motor control ports of the hydraulic motor 238. In certain examples, the hydraulic motor 238 may be a fixed displacement bi-directional motor that turns the output shaft 240. As such, when the directional control valve 224 is in the first configuration, no or minimal pressurized hydraulic fluid may reach the hydraulic motor 238 and the hydraulic motor 238 may be locked (e.g., may not be turning). When the directional control valve 224 is in the second configuration, the hydraulic motor 238 may turn in a first direction and when the directional control valve 224 is in the third configuration, the hydraulic motor 238 may turn in a second direction.

The output shaft 240 may, in certain examples, be connected to a HSTA gearbox. The HSTA gearbox may control the displacement and/or rate of change of the horizontal stabilizers 174. The gearbox may be controlled by the controller 108, may be pilot controlled, may be controller through mechanical means, may be a fixed gear ratio, or may be controlled through another technique. In certain examples, there may be multiple hydraulic motors 238 and/or multiple output shafts 240. In such examples, a speed-summing differential may be included to combine the rotation of the multiple hydraulic motors 238 and/or the multiple output shafts 240.

In certain examples, the anti-cavitation valves 248 may allow hydraulic fluid to enter the motor control ports if pressure within the third hydraulic path 236 drops below a return pressure (e.g., a pressure of the return line 250).

The hydraulic brake 242 may be a power-off brake (e.g., when pressurized hydraulic fluid is not flowing into a port of the hydraulic brake 242, the brake may be set and may restrict rotation of the output shaft 240). In certain examples, the brake controller 244 may be a hydraulic brake solenoid operated valve (SOV) though other examples may include other types of brake controllers, such as electronic controllers or other types of valves. The brake controller 244 may control pressure to the hydraulic brake 242. The brake controller 244 may be a normally closed 3-port 2-position solenoid operated valve. When the brake controller 244 is energized, pressurized hydraulic fluid may flow to the hydraulic brake 242 and release the hydraulic brake 242. In certain examples, the pressurized hydraulic fluid may release the hydraulic brake 242 by overcoming a spring force holding the hydraulic brake 242 in a position restricting rotation of the output shaft 240. When the hydraulic brake 242 is released, the hydraulic brake 242 may no longer or may minimally restrict movement of the output shaft 240. In certain examples, the brake controller 244 and the hydraulic brake 242 may be replaced by an electric power-off brake (i.e., an electric brake). In such examples, the electric power-off brake may restrict movement of the output shaft 240 when engaged (e.g., when an instruction (i.e., an engagement instruction) is provided to the electric power-off brake from the controller 108).

In certain examples, a pressure switch and/or pressure transducer may be included between the brake controller 244 and the hydraulic brake 242. Additionally or alternatively, a LVDT may be coupled to the hydraulic brake 242 (e.g., the brake piston of the hydraulic brake 242). Such an LVDT may provide information as to whether the hydraulic brake 242 is engaged.

Additionally, a return check valve 246 may be on the return line 250. The return check valve 246 may prevent system and return pressure transients from reaching the hydraulic brake 242 (e.g., may prevent momentary pressures from disengaging the hydraulic brake 242). In certain other examples, the return line 250 may include a hydraulic accumulator alternative or in addition to the return check valve 246. The hydraulic accumulator may prevent cavitation of the hydraulic fluid within the hydraulic motor.

Various hydraulic paths of the HSTA 200 may be fluidically connected to the return port 252. The return port 252 may be connected to a source of pressurized hydraulic fluid. In certain examples, the return port 252 may be fluidically connected to the same source of pressurized hydraulic fluid that provides fluid to the inlet 202. The return port 252 may receive excess hydraulic fluid pressure of the HSTA 200.

The HSTA 200 may provide for three independent techniques for shutdown when an un-commanded or unintended movement event is detected. For example, the shutoff SOV 208 may be de-energized (e.g., by the controller 108, the pilot, or another input). De-energizing the shutoff SOV 208 may block inlet pressure from the inlet 202 from reaching the rest of the HSTA 200 and may connect the second hydraulic path 212 to the return port 252. Additionally, the control trim up SOV 220 and the control trim down SOV 222 may also be de-energized. De-energizing the control trim up SOV 220 and the control trim down SOV 222 may cause the directional control valve 224 to transition to the first configuration and lock the hydraulic motor 238 in place. Also, the brake controller 244 may be de-energized and cause the hydraulic brake 242 to engage to restrain movement of the output shaft 240. Restraining the movement of the output shaft 240 may prevent movement of any movable control surfaces (e.g., movable wing components 182A-G, movable stabilizer components 184A-C, and/or horizontal stabilizers 174) coupled to the HSTA 200.

Figure 3A:
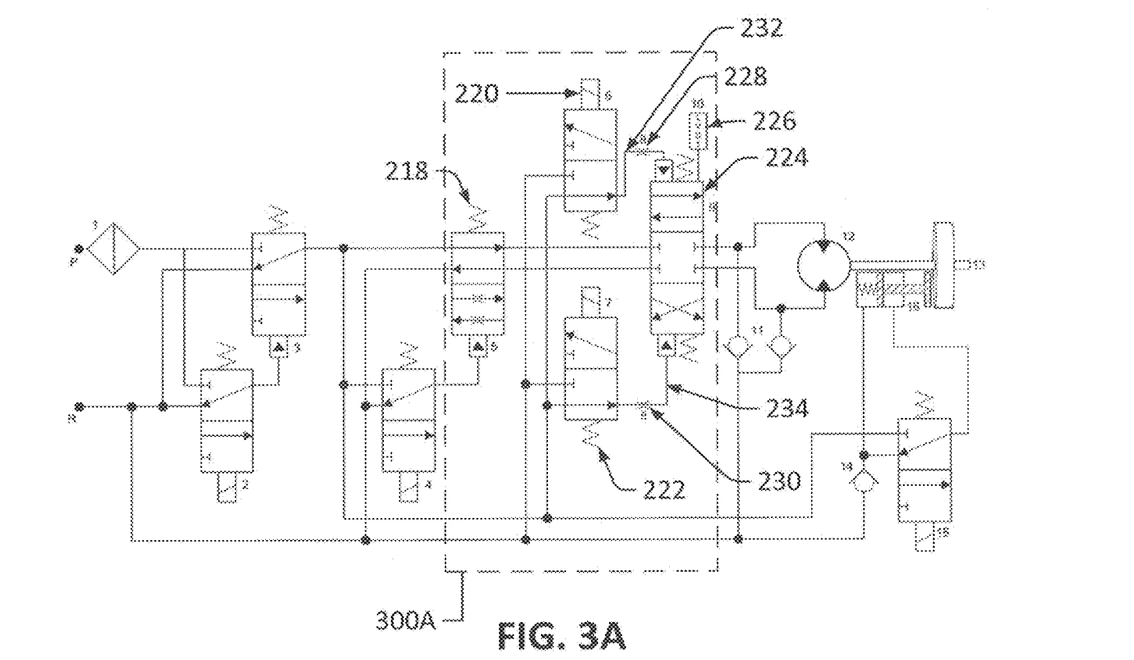
FIGS. 3A-B illustrate an alternative directional and rate control valve configuration of a horizontal stabilizer trim actuator in accordance with an example of the disclosure.
Figure 3B:
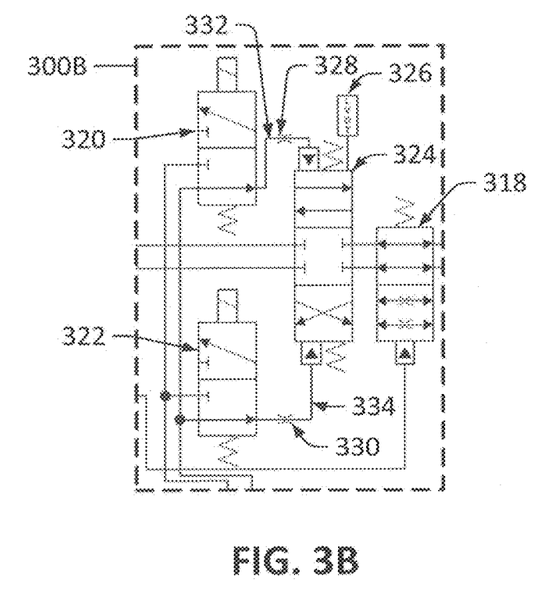

FIGS. 3A-B illustrate an alternative directional and rate control valve configuration of a horizontal stabilizer trim actuator in accordance with an example of the disclosure. FIG. 3A illustrates a directional and rate control component configuration 300A that includes the rate control spool 218, the control trim up SOV 220, the control trim down SOV 222, the directional control valve 224, the LVDT 226, the fourth hydraulic path 232, the fifth hydraulic path 234, and the pilot pressure restrictions 228 and 230. The configuration shown in FIG. 3A may be similar to that described in FIG. 2.

FIG. 3B may illustrate an alternative directional and rate control component configuration 300B. The alternative directional and rate control component configuration 300B, may include a rate control spool 318, a control trim up SOV 320, a control trim down SOV 322, a directional control valve 324, a LVDT 326, fourth hydraulic path 332, fifth hydraulic path 334, and pilot pressure restrictions 328 and 330.

The alternative directional and rate control component configuration 300B may be similar to the directional and rate control component configuration 300A. However, in the alternative directional and rate control component configuration 300B, pressurized hydraulic fluid from the second hydraulic path (not shown in FIG. 3B, but shown in FIG. 2) may flow to the directional control valve 324. The rate control spool 318 may receive pressurized hydraulic fluid from the directional control valve 324. Pressurized hydraulic fluid may then flow from the rate control spool 318 to the third hydraulic path 236 (not shown in FIG. 3B, but shown in FIG. 2).

Figure 4A:
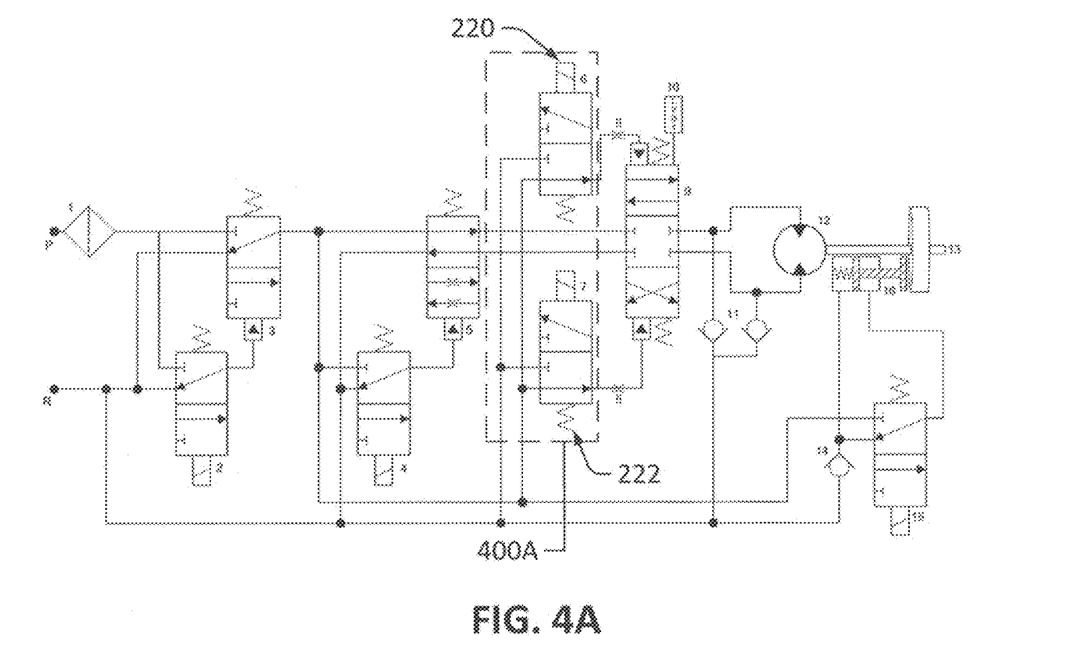
FIGS. 4A-B illustrate an alternative trim up solenoid operated valve and trim down solenoid operated valve configuration of a horizontal stabilizer trim actuator in accordance with an example of the disclosure.
Figure 4B:
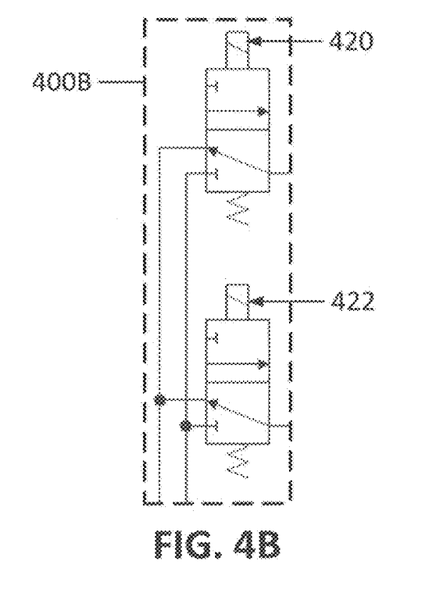

FIGS. 4A-B illustrate an alternative trim up solenoid operated valve and trim down solenoid operated valve configuration of a horizontal stabilizer trim actuator in accordance with an example of the disclosure. FIG. 4A illustrates a control trim up and trim down configuration 400A that includes the control trim up SOV 220 and the control trim down SOV 222. The configuration shown in FIG. 4A may be similar to that described in FIG. 2.

FIG. 4B illustrates an alternative control trim up and trim down configuration 400B. The alternative control trim up and trim down configuration 400B includes a control trim up SOV 420 and a control trim down SOV 422. The control trim up SOV 420 and the control trim down SOV 422 may be normally closed SOVs. As such, when the control trim up SOV 420 and the control trim down SOV 422 are uncommanded, the fourth hydraulic path 232 and the fifth hydraulic path 234 are fluidically connected to the return line 250. The directional control valve (not shown in FIG. 4B, but shown in FIG. 2) may be spring-centered to its first configuration. When one of the control trim up SOV 420 or the control trim down SOV 422 is energized, pilot pressure may be ported to the directional control valve 224. Such pressure may change the position of the direction control valve 224 to a flow-through position (i.e., flow-through configuration).

Figure 5A:
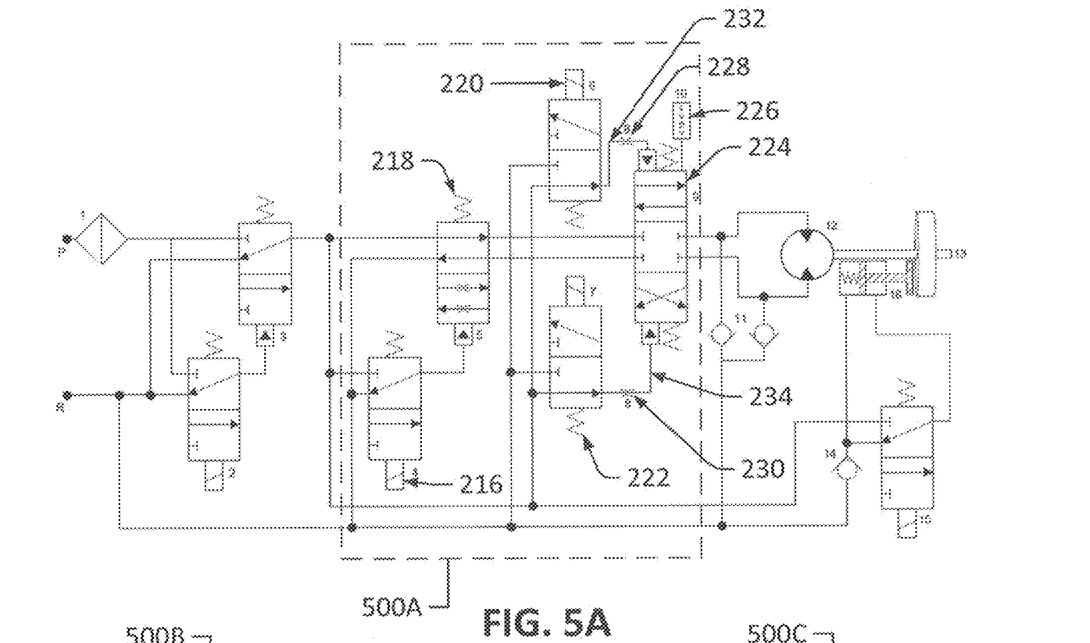
FIGS. 5A-C illustrate alternative directional and rate control configurations of a horizontal stabilizer trim actuator in accordance with an example of the disclosure.
Figure 5B:
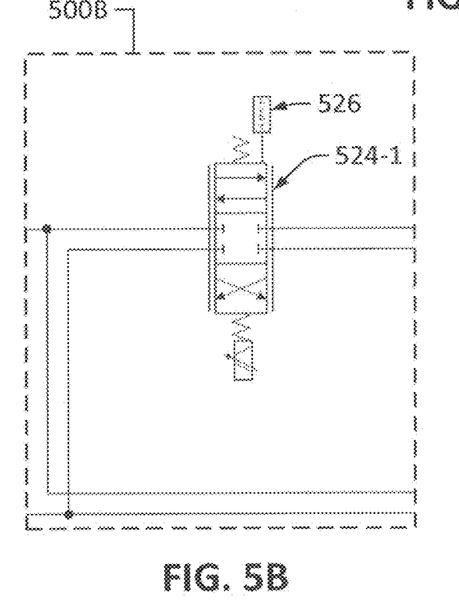
Figure 5C:
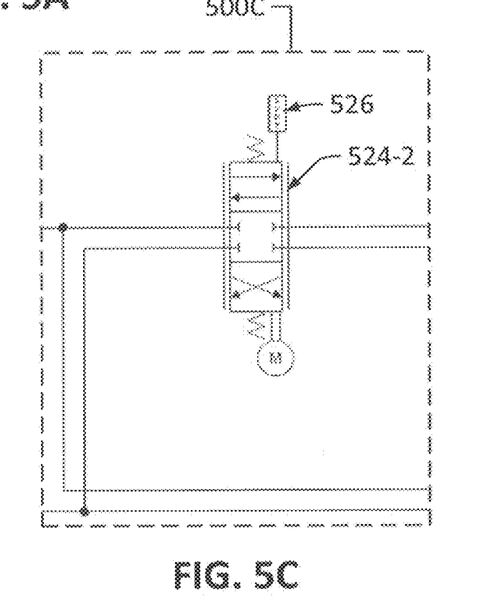

FIGS. 5A-C illustrate alternative directional and rate control configurations of a horizontal stabilizer trim actuator in accordance with an example of the disclosure. FIG. 5A illustrates a directional and rate control configuration 500A that includes the rate control SOV 216, the rate control spool 218, the control trim up SOV 220, the control trim down SOV 222, the directional control valve 224, the LVDT 226, the fourth hydraulic path 232, the fifth hydraulic path 234, and the pilot pressure restrictions 228 and 230. The configuration shown in FIG. 5A may be similar to that described in FIG. 2.

FIG. 5B may illustrate an alternative directional and rate control configuration 500B. The alternative directional and rate control configuration 500B may include an electro-hydraulic servo valve 524-1 and a LVDT 526. The electro-hydraulic servo valve 524-1 may be a 4-port 3-position electronically controlled valve. The electro-hydraulic servo valve 524-1 may be controlled by an external source such as the controller 108, input from the pilot, or from another technique. The LVDT 526 may monitor the position of the electro-hydraulic servo valve 524-1.

FIG. 5C may illustrate another alternative directional and rate control configuration 500C. The directional and rate control configuration 500C may include a direct drive valve 524-2 and the LVDT 526. The direct drive valve 524-2 may be a 4-port 3-position linear or rotary direct drive valve. The LVDT 526 may monitor the position of the direct drive valve 524-2.

Figure 6A:
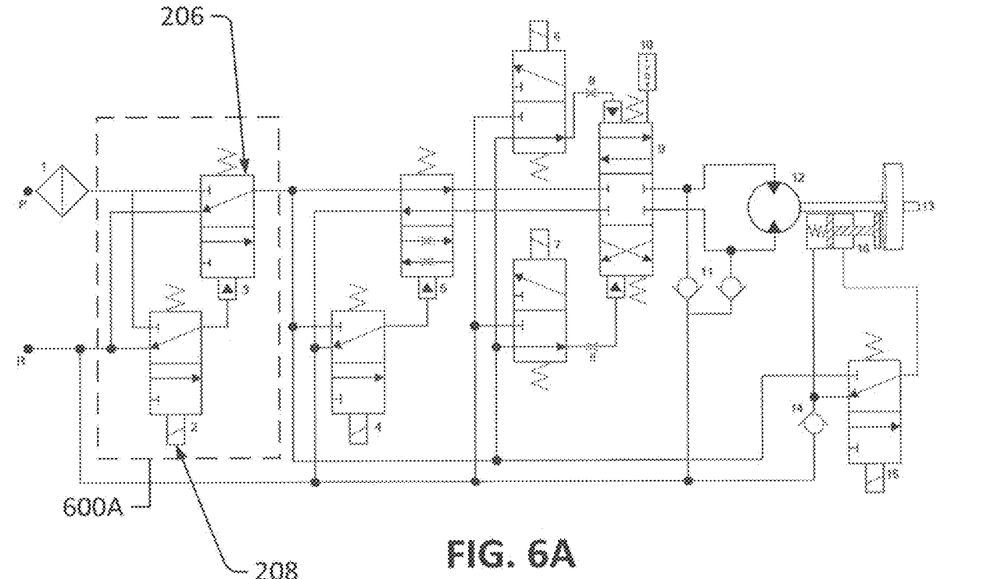
FIGS. 6A-E illustrate alternative shutoff valve configurations of a horizontal stabilizer trim actuator in accordance with an example of the disclosure.
Figure 6B:
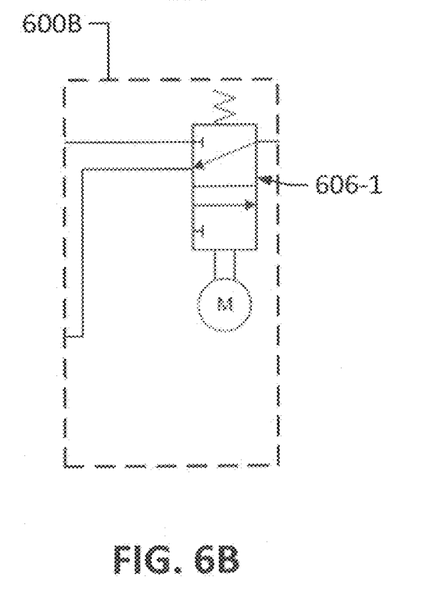
Figure 6C:
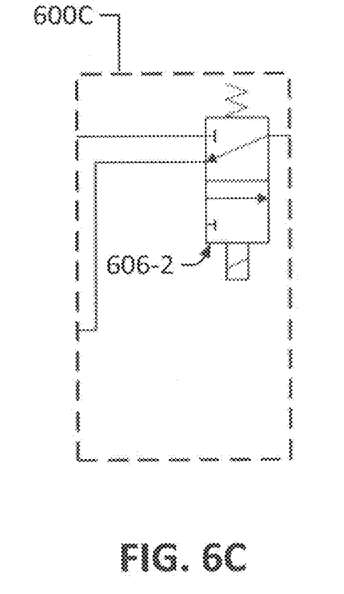
Figure 6D:
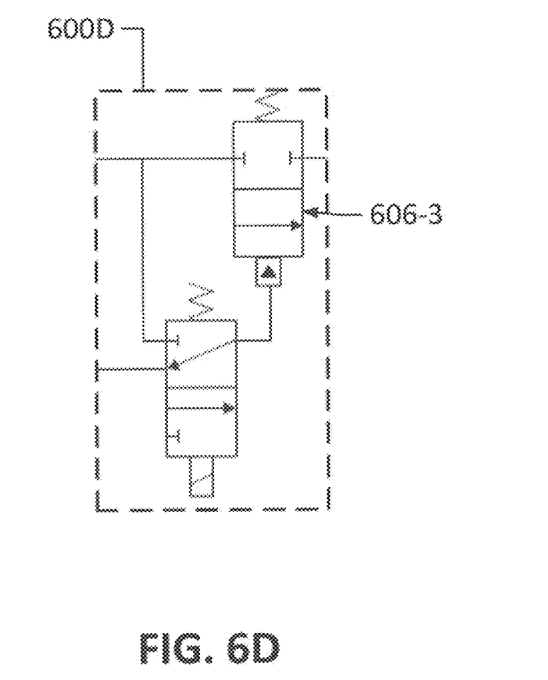
Figure 6E:
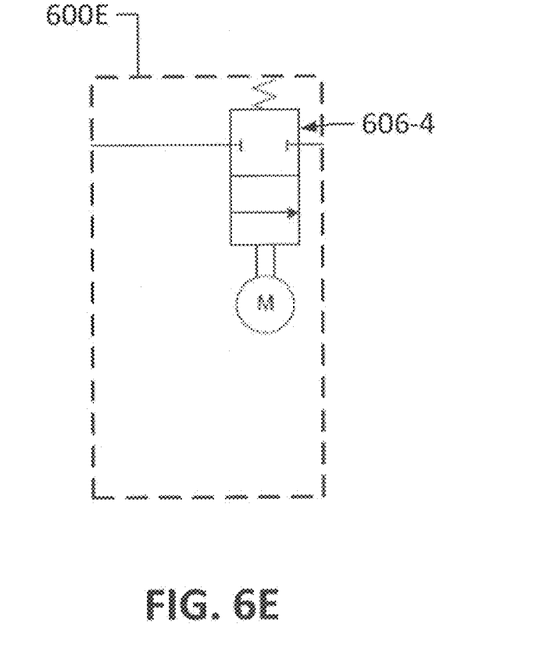

FIGS. 6A-E illustrate alternative shutoff valve configurations of a horizontal stabilizer trim actuator in accordance with an example of the disclosure. FIG. 6A illustrates a shutoff valve configuration 600A that includes the shutoff SOV 208 and the shutoff spool 206. The configuration shown in FIG. 6A may be similar to that described in FIG. 2.

FIGS. 6B-E may illustrate alternative shutoff valve configurations 600B-E. The shutoff valve configuration 600B may include a motor operated 3-port 2-position shutoff valve 606-1. The shutoff valve configuration 600C may include a solenoid operated 3-port 2-position shutoff valve 606-2. The shutoff valve configuration 600D may replace the 3-port 2-position shutoff spool 206 of configuration 600A with a pilot operated 2-port 2-position shutoff valve. The shutoff valve configuration 600E may include a motor operated 2-port 2-position shutoff valve.

Figure 7:
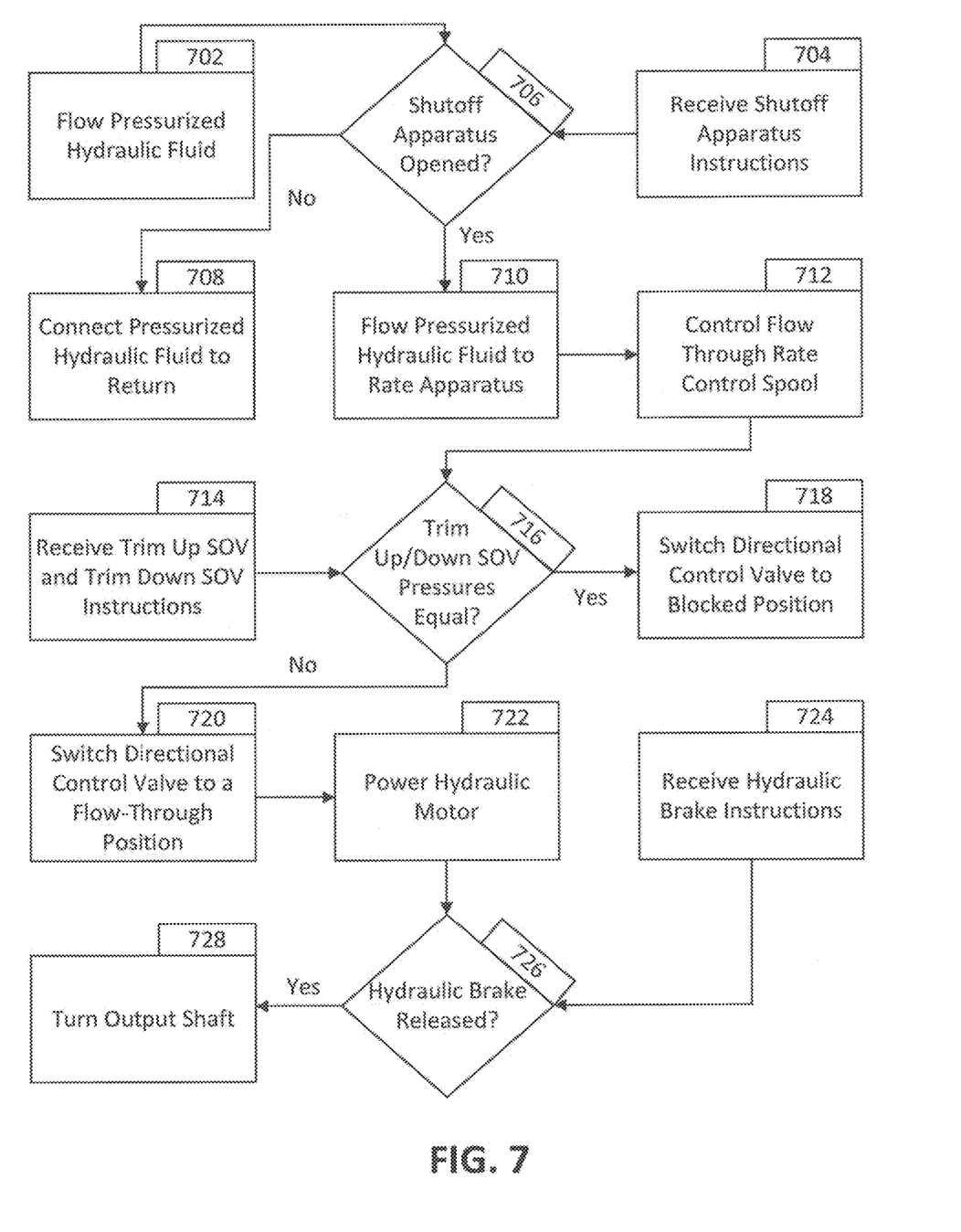
FIG. 7 illustrates a flowchart detailing operation of a horizontal stabilizer trim actuator in accordance with an example of the disclosure.

FIG. 7 illustrates a flowchart detailing operation of a horizontal stabilizer trim actuator in accordance with an example of the disclosure. In block 702, pressurized hydraulic fluid may flow through the inlet 202 and the filter 210. In block 704, instructions (i.e., engagement instructions) from the controller 108 and/or the pilot may be provided to the shutoff apparatus. The controller 108 and/or the pilot may, for example, provide instructions to energize the solenoid of the shutoff SOV 208. In block 706, the instructions may be received and, if the solenoid of the shutoff SOV 208 is to be energized, the shutoff apparatus is opened, and the process may proceed to block 710. If the solenoid of the shutoff SOV 208 is de-energized, the shutoff apparatus is not opened, and the process may proceed to block 708 and connect pressurized hydraulic fluid to the return port 252 and, thus, depressurize the hydraulic fluid.

In block 710, pressurized hydraulic fluid may flow to the directional and rate control apparatus. In block 712, the flow rate through the rate control spool 218 may be controlled. The controller 108 and/or the pilot may control the flow rate through the rate control spool 218 by, for example, energizing or de-energizing the rate control SOV 216 to control the restriction of the rate control spool 218 to the flow of pressurized hydraulic fluid.

In block 714, the control trim up SOV 220 and/or the control trim down SOV 222 may receive instructions from the controller 108 and/or the pilot. The instructions may operate the solenoid of the control trim up SOV 220 and/or the control trim down SOV 222 and/or may operate one or both of the pilot pressure restrictions 228 and/or 230. If, from block 714, the pilot pressure from the control trim up SOV 220 and the control trim down SOV 222 are in equal block 716, the process may switch the directional control valve 224 to a blocked position (e.g., the first configuration described in FIG. 2) in block 718. Otherwise, the process may proceed to block 720 and switch the directional control valve 224 to a flow-through position (e.g., a position where pressurized hydraulic fluid may flow through the directional control valve 224 such as the second or third configuration described in FIG. 2).

The flow of pressurized hydraulic fluid through the directional control valve 224 may power the hydraulic motor 238 in block 722. Additionally, in block 724, instructions may be received to release the hydraulic brake 242. If instructions are received for releasing the hydraulic brake 242, the hydraulic brake SOV 244 may be opened and may release the hydraulic brake 242 in block 726. The output shaft 240 may then be turned in block 728.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure.

What is claimed is:

1. A control surface control system comprising:
   a hydraulic inlet configured to receive pressurized hydraulic fluid;
   a first hydraulic path fluidically connected to the hydraulic inlet;
   a second hydraulic path;
   a hydraulic shutoff apparatus fluidically connected to the first hydraulic path and the second hydraulic path and configured to be switched between a plurality of hydraulic positions, wherein at least one of the hydraulic positions allows for the pressurized hydraulic fluid to flow from the first hydraulic path through the hydraulic shutoff apparatus to the second hydraulic path;
   a directional and rate control apparatus;
   a third hydraulic path fluidically connected to the directional and rate control apparatus; and
   a hydraulic motor fluidically connected to the directional and rate control apparatus via the third hydraulic path, wherein:
      the directional and rate control apparatus is configured to be switched between a plurality of directional control positions wherein at least one of the directional control positions allows for the pressurized hydraulic fluid to flow from the second hydraulic path through the directional and rate control apparatus to the hydraulic motor;
      the hydraulic motor is configured to turn an output shaft to actuate the control surface of the vehicle responsive to receiving the pressurized hydraulic fluid from the directional and rate control apparatus and configured to be locked responsive to not receiving the pressurized hydraulic fluid from the directional and rate control apparatus;
   a brake apparatus connected to the hydraulic motor and/or the output shaft;
   a fourth hydraulic path;
   a fifth hydraulic path, wherein the directional and rate control apparatus comprises a directional control valve and a pressure centered apparatus fluidically connected to the fourth hydraulic path and the fifth hydraulic path and configured to switch between the plurality of directional control positions responsive to the flow of the pressurized hydraulic fluid from the fourth hydraulic path and the fifth hydraulic path;
   a control trim up solenoid operated valve (SOV) fluidically connected to the second hydraulic path and the fourth hydraulic path, wherein the control trim up SOV is a three port two position SOV configured to allow flow of the pressurized hydraulic fluid to the fourth hydraulic path in an open position and configured to prevent flow of the pressurized hydraulic fluid in a closed position; and
   a control trim down SOV fluidically connected to the second hydraulic path and the fifth hydraulic path, wherein the control trim down SOV is a three port two position SOV configured to allow flow of the pressurized hydraulic fluid to the fifth hydraulic path in an open position and configured to prevent flow of the pressurized hydraulic fluid in a closed position;
   wherein the directional control valve is a four port valve and is configured to be switched between at least three positions comprising:
      a first position configured to prevent flow of the pressurized hydraulic fluid through the directional control valve;
      a second position configured to allow for the pressurized hydraulic fluid to flow through the directional control valve to the hydraulic motor in a first manner; and
      a third position configured to allow for the pressurized hydraulic fluid to flow through the directional control valve to the hydraulic motor in a second manner.

2. The control surface control system of claim 1, wherein the brake apparatus comprises:
   a brake controller fluidically connected to the hydraulic shutoff apparatus via the second hydraulic path, wherein the brake controller is configured to allow flow of the pressurized hydraulic fluid in an open position and configured to prevent flow of the pressurized hydraulic fluid in a closed position; and
   a hydraulic brake configured to restrict movement of the hydraulic motor and/or the output shaft responsive to not receiving the pressurized hydraulic fluid from the brake controller.

3. The control surface control system of claim 2, wherein the brake controller is a hydraulic brake solenoid operated valve (SOV) comprising a three port two position SOV.

4. The control surface control system of claim 1, wherein the hydraulic shutoff apparatus comprises:
   a shutoff solenoid operated valve (SOV) fluidically connected to the first hydraulic path, wherein the shutoff SOV is a three port two position SOV configured to allow flow of the pressurized hydraulic fluid in an open position and configured to prevent flow of the pressurized hydraulic fluid in a closed position; and
   a shutoff spool fluidically connected to the first hydraulic path, wherein the shutoff spool is a three port two position pilot operated valve configured to, responsive to the shutoff SOV allowing flow of the pressurized hydraulic fluid, allow flow of the pressurized hydraulic fluid from the first hydraulic path to the directional and rate control apparatus.

5. The control surface control system of claim 1, wherein the directional control valve is configured to:
   be in the first position responsive to substantially equal hydraulic pressure within the fourth hydraulic path and the fifth hydraulic path;
   be in the second position responsive to hydraulic pressure that is substantially greater within the fourth hydraulic path than within the fifth hydraulic path; and
   be in the third position responsive to hydraulic pressure that is substantially greater within the fifth hydraulic path than within the fourth hydraulic path.

6. The control surface control system of claim 5, further comprising:
   a first pilot operated restriction coupled to the fourth hydraulic path and configured to restrict flow of the pressurized hydraulic fluid through the fourth hydraulic path; and
   a second pilot operated restriction coupled to the fifth hydraulic path and configured to restrict flow of the pressurized hydraulic fluid through the fifth hydraulic path.

7. The control surface control system of claim 1, wherein the control trim up SOV is configured to be normally in the open position and the control trim down SOV is configured to be normally in the open position.

8. The control surface control system of claim 1, wherein the control trim up SOV is configured to be normally in the closed position and the control trim down SOV is configured to be normally in the closed position.

9. The control surface control system of claim 1, wherein the hydraulic shutoff apparatus comprises:
a shutoff solenoid operated valve (SOV) fluidically connected to the first hydraulic path, wherein the shutoff SOV is a three port two position SOV configured to allow flow of the pressurized hydraulic fluid in an open position and configured to prevent flow of the pressurized hydraulic fluid in a closed position; and
a shutoff spool fluidically connected to the first hydraulic path, wherein the shutoff spool is a two port two position pilot operated valve configured to, responsive to the shutoff SOV allowing flow of the pressurized hydraulic fluid, allow flow of the pressurized hydraulic fluid from the first hydraulic path to the directional and rate control apparatus.

10. The control surface control system of claim 1, wherein the hydraulic shutoff apparatus comprises one of:
a shutoff valve fluidically connected to the first hydraulic path, wherein the shutoff valve is a three port two position motor operated valve configured to allow flow of the pressurized hydraulic fluid in an open position and configured to prevent flow of the pressurized hydraulic fluid in a closed position;
a shutoff valve fluidically connected to the first hydraulic path, wherein the shutoff valve is a two port two position motor operated valve configured to allow flow of the pressurized hydraulic fluid in an open position and configured to prevent flow of the pressurized hydraulic fluid in a closed position; or
a shutoff valve fluidically connected to the first hydraulic path, wherein the shutoff valve is a two port two position solenoid operated valve configured to allow flow of the pressurized hydraulic fluid in an open position and configured to prevent flow of the pressurized hydraulic fluid in a closed position.

11. The control surface control system of claim 1, further including
an inlet filter disposed between the hydraulic inlet and the first hydraulic path, and
return port fluidically connected to the directional and rate control apparatus.

12. The control surface control system of claim 1, wherein the directional and rate control apparatus further comprises a linear variable differential transformer configured to monitor the position of a directional control valve.

13. The control surface control system of claim 1, wherein the brake apparatus comprises: an electric brake configured to restrict movement of the hydraulic motor and/or the output shaft responsive to receiving an engagement instruction from a controller.

14. An aircraft comprising the control surface control system of claim 1, wherein the vehicle is the aircraft and the aircraft comprises:
a fuselage; and
the control surface coupled to the fuselage.

15. A control surface control system
a hydraulic inlet configured to receive pressurized hydraulic fluid;
a first hydraulic path fluidically connected to the hydraulic inlet;
a second hydraulic path;
a hydraulic shutoff apparatus fluidically connected to the first hydraulic path and the second hydraulic path and configured to be switched between a plurality of hydraulic positions, wherein at least one of the hydraulic positions allows for the pressurized hydraulic fluid to flow from the first hydraulic path through the hydraulic shutoff apparatus to the second hydraulic path;
a directional and rate control apparatus;
a third hydraulic path fluidically connected to the directional and rate control apparatus; and
a hydraulic motor fluidically connected to the directional and rate control apparatus via the third hydraulic path, wherein:
the directional and rate control apparatus is configured to be switched between a plurality of directional control positions wherein at least one of the directional control positions allows for the pressurized hydraulic fluid to flow from the second hydraulic path through the directional and rate control apparatus to the hydraulic motor;
the hydraulic motor is configured to turn an output shaft to actuate the control surface of the vehicle responsive to receiving the pressurized hydraulic fluid from the directional and rate control apparatus and configured to be locked responsive to not receiving the pressurized hydraulic fluid from the directional and rate control apparatus; and
a brake apparatus connected to the hydraulic motor and/or the output shaft;
wherein the directional and rate control apparatus includes a directional control valve and a rate apparatus that comprises:
a rate control solenoid valve (SOV) fluidically connected to the second hydraulic path, wherein the rate control SOV is a three port two position SOV configured to allow flow of the pressurized hydraulic fluid to a rate control spool in an open position and configured to prevent flow of the pressurized hydraulic fluid in a closed position; and
the rate control spool, wherein the rate control spool is a four port two position pilot operated valve configured to, responsive to the rate control SOV allowing flow of the pressurized hydraulic fluid, further restrict flow of hydraulic fluid through the rate control spool.

16. The control surface control system of claim 15, wherein the rate control spool is fluidically connected to the second hydraulic path and configured to allow flow of the pressurized hydraulic fluid from the second hydraulic path through the rate control spool to the directional control valve and the directional control valve is fluidically connected to the hydraulic motor.

17. The control surface control system of claim 15, wherein the directional control valve is fluidically connected to the second hydraulic path, the at least one of the directional control positions is configured to allow flow of the pressurized hydraulic fluid from the second hydraulic path through the directional control valve to the rate control spool, and the rate control spool is fluidically connected to the hydraulic motor.

18. The control surface control system of claim 6, further comprising:
a fourth hydraulic path;
a fifth hydraulic path, wherein the directional control valve is fluidically connected to the fourth hydraulic path and the fifth hydraulic path and configured to switch between the plurality of directional control positions responsive to the flow of the pressurized hydraulic fluid from the fourth hydraulic path and the fifth hydraulic path;

a control trim up solenoid operated valve (SOV) fluidically connected to the second hydraulic path and the fourth hydraulic path, wherein the control trim up SOV is a three port two position SOV configured to allow flow of the pressurized hydraulic fluid to the fourth hydraulic path in an open position and configured to prevent flow of the pressurized hydraulic fluid in a closed position; and a control trim down SOV fluidically connected to the second hydraulic path and the fifth hydraulic path, wherein the control trim down SOV is a three port two position SOV configured to allow flow of the pressurized hydraulic fluid to the fifth hydraulic path in an open position and configured to prevent flow of the pressurized hydraulic fluid in a closed position.

19. The control surface control system of claim 18, wherein the directional control valve is a four port valve and is configured to be switched between at least three positions comprising:
   a first position configured to prevent flow of the pressurized hydraulic fluid through the directional control valve;
   a second position configured to allow for the pressurized hydraulic fluid to flow through the directional control valve to the hydraulic motor in a first manner; and
   a third position configured to allow for the pressurized hydraulic fluid to flow through the directional control valve to the hydraulic motor in a second manner.

20. The control surface control system of claim 15, wherein the directional and rate control apparatus is configured to be switched between the plurality of positions by an electro-hydraulic servo valve or a direct drive valve and the directional and rate control apparatus is fluidically connected to the second hydraulic path.

21. A method of controlling a control surface, the method comprising:
   receiving pressurized hydraulic fluid;
   flowing the pressurized hydraulic fluid into a hydraulic shutoff apparatus;
   switching, responsive to the flow of the pressurized hydraulic fluid into the hydraulic shutoff apparatus, the hydraulic shutoff apparatus to a first hydraulic position;
   flowing the pressurized hydraulic fluid into a directional and rate control apparatus;
   switching, responsive to the flow of the pressurized hydraulic fluid into the directional and rate control apparatus, a rate control solenoid operated valve (SOV) to an open position to allow flow of the pressurized hydraulic fluid to a rate control spool, wherein the rate control SOV is a three port two position SOV configured to allow flow of the pressurized hydraulic fluid to the rate control spool in the open position and configured to prevent flow of the pressurized hydraulic fluid in a closed position;
   changing a flow restriction of hydraulic fluid through the rate control spool responsive to the rate control SOV allowing flow of the pressurized hydraulic fluid to the rate control spool, wherein the rate control spool is a four port two position pilot operated valve configured to allow hydraulic fluid to flow both to and from a hydraulic motor in each of the two positions of the rate control valve, with one of the two positions being more restrictive to the flow of hydraulic fluid through the rate control spool than the other of the two positions;
   switching, responsive to the flow of the pressurized hydraulic fluid through the rate control spool, a directional control valve of the directional and rate control apparatus to a first directional control position;
   monitoring the position of the directional control valve;
   responsive to the flow of the pressurized hydraulic fluid from the directional control valve into the hydraulic motor, turning an output shaft of the hydraulic motor, and
   actuating the control surface connected to the output shaft.

22. The method of claim 21, wherein switching the hydraulic shutoff apparatus to the first hydraulic position comprises:
   switching a shutoff solenoid operated valve (SOV) to an open position to allow flow of the pressurized hydraulic fluid to a shutoff spool; and
   switching the shutoff spool, responsive to the flow of the pressurized hydraulic fluid to the shutoff spool, to flow the pressurized hydraulic fluid into the directional and rate control apparatus and a brake controller.

23. The method of claim 21, wherein switching the directional control valve of the directional and rate control apparatus to the first directional control position comprises:
   flowing pressurized hydraulic fluid through at least one of a control trim up SOV and/or a control trim down SOV such that hydraulic pressures through the control trim up SOV and the control trim down SOV are substantially different: and
   switching the directional control valve to a flow-through configuration responsive to a substantially different hydraulic pressures through the control trim up SOV and the control trim down SOV to flow the pressurized hydraulic fluid to the hydraulic motor.

24. The method of claim 23, wherein switching the directional control valve further comprises restricting flow of the pressurized hydraulic fluid through the control trim up SOV or the control trim down SOV.

25. The method of claim 21, wherein the directional control valve is switched between a plurality of positions by an electro-hydraulic servo valve.

26. The method of claim 21, further comprising:
   switching a brake controller to an open position to allow flow of the pressurized hydraulic fluid to a hydraulic brake; and
   releasing the hydraulic brake configured responsive to the flow of the pressurized hydraulic fluid from the brake controller to the hydraulic brake.

27. The method of claim 21, further comprising switching an electric brake to an open position.

* * * * *

UNITED STATES PATENT AND TRADEMARK OFFICE
CERTIFICATE OF CORRECTION

PATENT NO. : 11,235,861 B2  
APPLICATION NO. : 16/530719  
DATED : February 1, 2022  
INVENTOR(S) : Derek M. Joseph et al.

Page 1 of 1

It is certified that error appears in the above-identified patent and that said Letters Patent is hereby corrected as shown below:

In the Specification

In Column 1, Line 7, change "U.S. patent application Ser. No." to "U.S. Patent Application No.".

In the Claims

In Column 13, Line 58, please add "comprising:" after "system".

In Column 14, Line 58, please change "claim 6," to "claim 15,".

Signed and Sealed this  
Fifteenth Day of March, 2022

Drew Hirshfeld  
*Performing the Functions and Duties of the  
Under Secretary of Commerce for Intellectual Property and  
Director of the United States Patent and Trademark Office*